(12) United States Patent
Lung et al.

(10) Patent No.: US 10,486,346 B2
(45) Date of Patent: Nov. 26, 2019

(54) SYSTEM WITH PLUG ASSEMBLY FOR CONTINUOUS MOLDING AND CURING OF TIRE TREAD

(71) Applicants: COMPAGNIE GENERALE DES ETABLISSEMENTS MICHELIN, Clermont-Ferrand (FR); David Lung, Greenville, SC (US); John Hommerson, Greenville, SC (US); Michael Petrovich, Greenville, SC (US)

(72) Inventors: David Lung, Greenville, SC (US); John Hommerson, Greenville, SC (US); Michael Petrovich, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 246 days.

(21) Appl. No.: 15/538,708

(22) PCT Filed: Apr. 19, 2016

(86) PCT No.: PCT/US2016/028218
§ 371 (c)(1),
(2) Date: Jun. 22, 2017

(87) PCT Pub. No.: WO2016/190989
PCT Pub. Date: Dec. 1, 2016

(65) Prior Publication Data
US 2018/0021989 A1    Jan. 25, 2018

Related U.S. Application Data

(63) Continuation of application No. PCT/US2015/032918, filed on May 28, 2015.

(51) Int. Cl.
*B29C 43/22* (2006.01)
*B29C 43/36* (2006.01)
(Continued)

(52) U.S. Cl.
CPC ...... *B29C 43/3607* (2013.01); *B29C 35/0277* (2013.01); *B29C 69/02* (2013.01);
(Continued)

(58) Field of Classification Search
CPC ...... B29D 30/06; B29D 30/52; B29C 43/085; B29C 43/22; B29C 43/3607; B29C 43/44; B29C 69/02
See application file for complete search history.

(56) References Cited

U.S. PATENT DOCUMENTS

| 3,594,866 A | 7/1971 | Skinner |
| 3,827,846 A | 8/1974 | Weiler |

(Continued)

FOREIGN PATENT DOCUMENTS

| GB | 1356857 | 6/1974 |
| GB | 2087298 A | 5/1982 |
| JP | 2014058046 | 4/2013 |

OTHER PUBLICATIONS

International Search Report re: PCT/US15/32918 dated Aug. 25, 2015.
(Continued)

*Primary Examiner* — James P Mackey
(74) *Attorney, Agent, or Firm* — Dority & Manning, P.A.

(57) ABSTRACT

A system for the continuous extrusion, molding, and curing of tread for tires. An elongated strip of rubber material can be molded and cured shortly after extrusion such that the material retains much of the heat energy of extrusion and does not have to be stored. A plurality of discrete mold assemblies are conveyed adjacent to each other. As the mold (Continued)

assemblies are advanced sequentially, the uncured and unmolded strip of rubber material are extruded and positioned onto the mold assemblies. While the rubber strip advances, individual portions are sequentially molded and cured by passing through a mold press and then a curing press. A plug assembly is used to prevent the backflow of rubber material during the molding and curing.

4 Claims, 18 Drawing Sheets

(51) Int. Cl.
| | | |
|---|---|---|
| *B29D 30/06* | (2006.01) | |
| *B29C 35/02* | (2006.01) | |
| *B29C 69/02* | (2006.01) | |
| *B29D 30/52* | (2006.01) | |
| B29C 43/44 | (2006.01) | |
| B29C 43/08 | (2006.01) | |
| B29C 37/00 | (2006.01) | |
| B29K 21/00 | (2006.01) | |
| B29C 48/08 | (2019.01) | |

(52) U.S. Cl.
CPC ............ *B29D 30/06* (2013.01); *B29D 30/52* (2013.01); *B29C 37/006* (2013.01); *B29C 43/085* (2013.01); *B29C 43/22* (2013.01); *B29C 43/44* (2013.01); *B29C 48/08* (2019.02); *B29K 2021/00* (2013.01)

(56) References Cited

U.S. PATENT DOCUMENTS

| | | | | |
|---|---|---|---|---|
| 4,003,686 | A | * | 1/1977 | McLeod ................. B29C 43/22 425/373 |
| 4,128,369 | A | | 12/1978 | Kemerer |
| 4,230,649 | A | * | 10/1980 | Bohm .................... B29D 30/52 156/129 |
| 4,285,654 | A | | 8/1981 | Bohm |
| 4,755,334 | A | * | 7/1988 | Grimm ................... B29C 39/14 264/167 |
| 4,808,257 | A | | 2/1989 | Rex |
| 4,818,203 | A | | 4/1989 | Majerus |
| 5,011,397 | A | * | 4/1991 | Remond ................. B29C 43/22 425/328 |
| 5,342,462 | A | | 8/1994 | King |
| 5,458,477 | A | | 10/1995 | Kemerer |
| 5,741,528 | A | * | 4/1998 | Amano .............. B29D 30/0603 425/29 |
| 6,187,252 | B1 | * | 2/2001 | Rhoades ............... B29C 51/087 156/285 |
| 6,790,301 | B2 | | 9/2004 | Risser |
| 2003/0041950 | A1 | | 3/2003 | Wellman |
| 2014/0060730 | A1 | | 3/2014 | Pan |

OTHER PUBLICATIONS

International Search Report re: PCT/US16/28218 dated Jul. 21, 2016.
International Search Report re: PCT/US2015/032911 dated Aug. 14, 2015.
International Search Report re: PCT/US16/28216 dated Jul. 21, 2016.

* cited by examiner

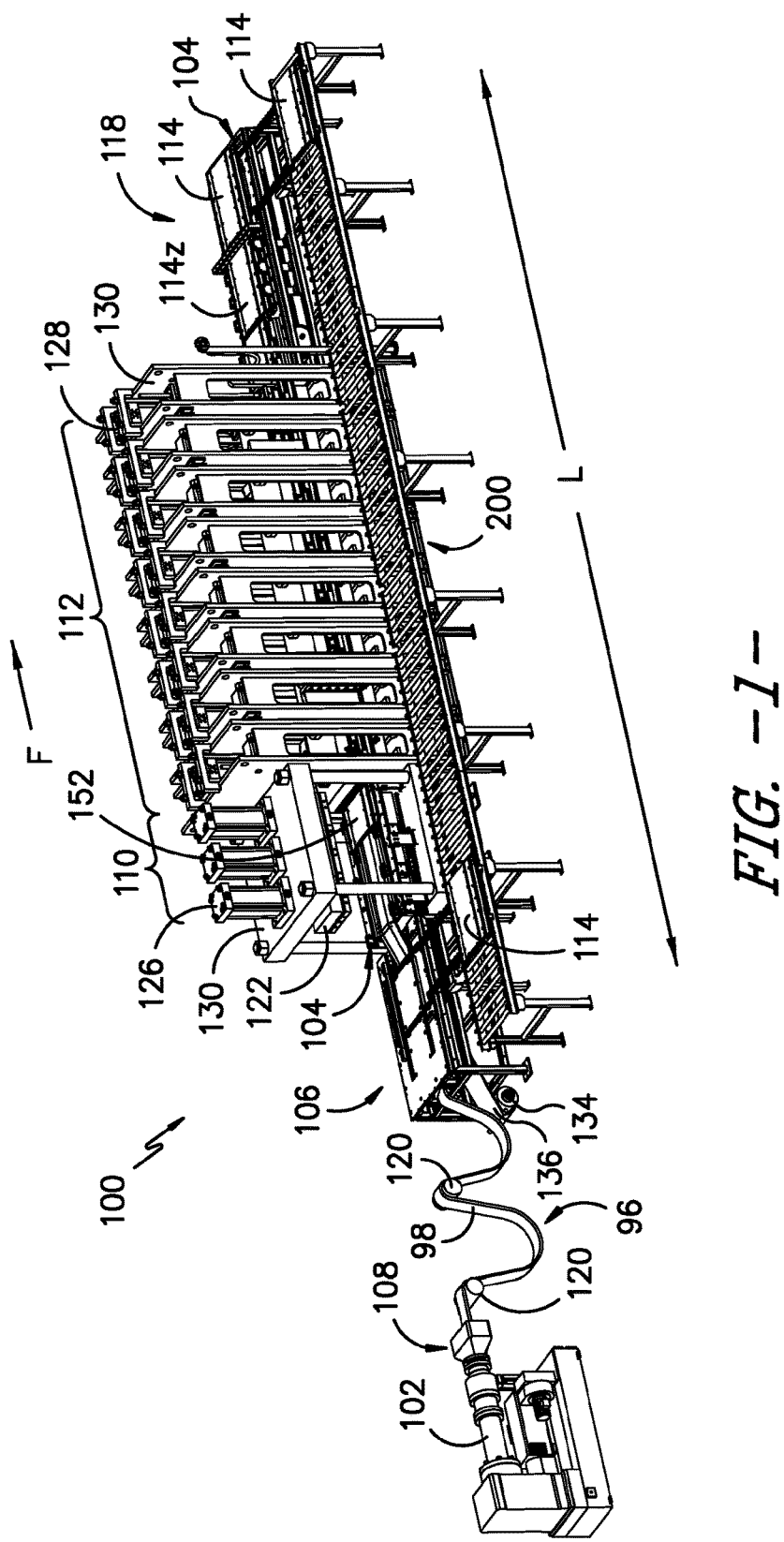

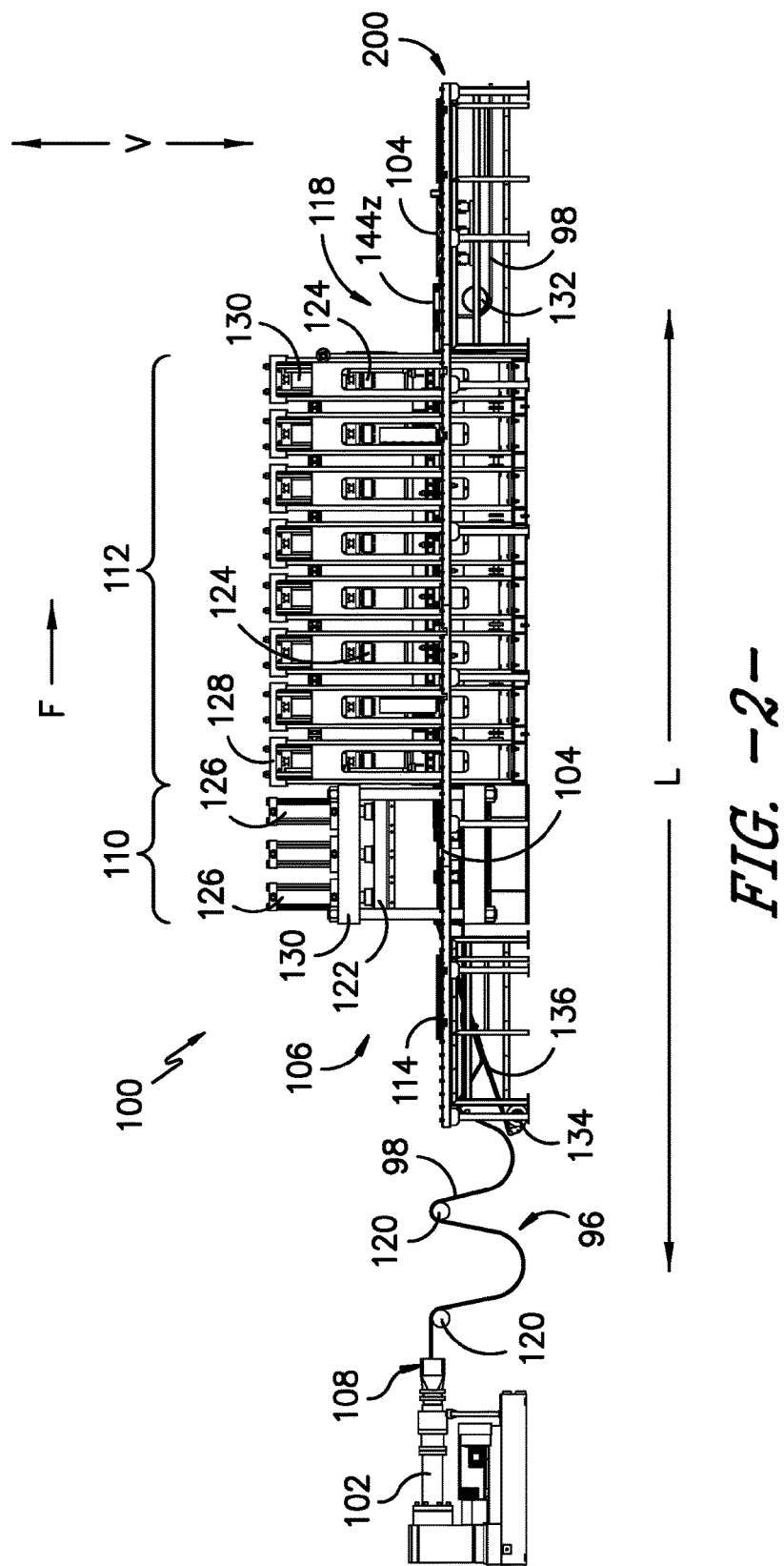
FIG. -2-

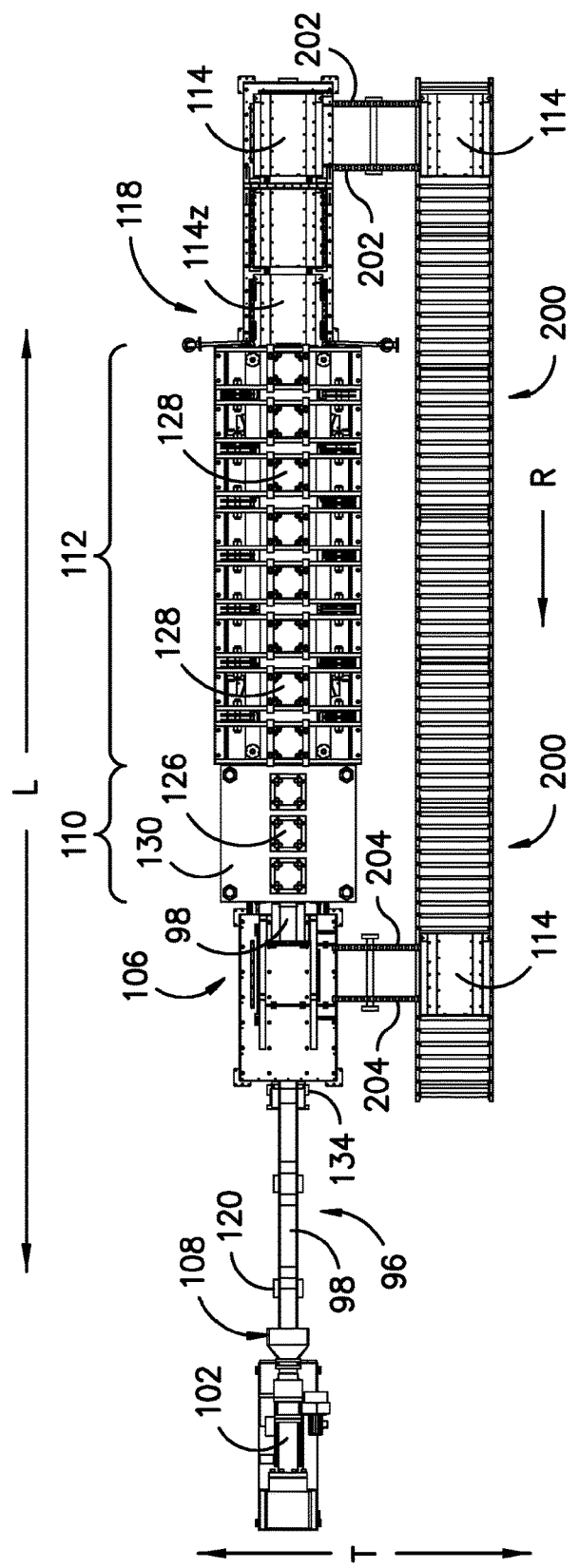
FIG. -3-

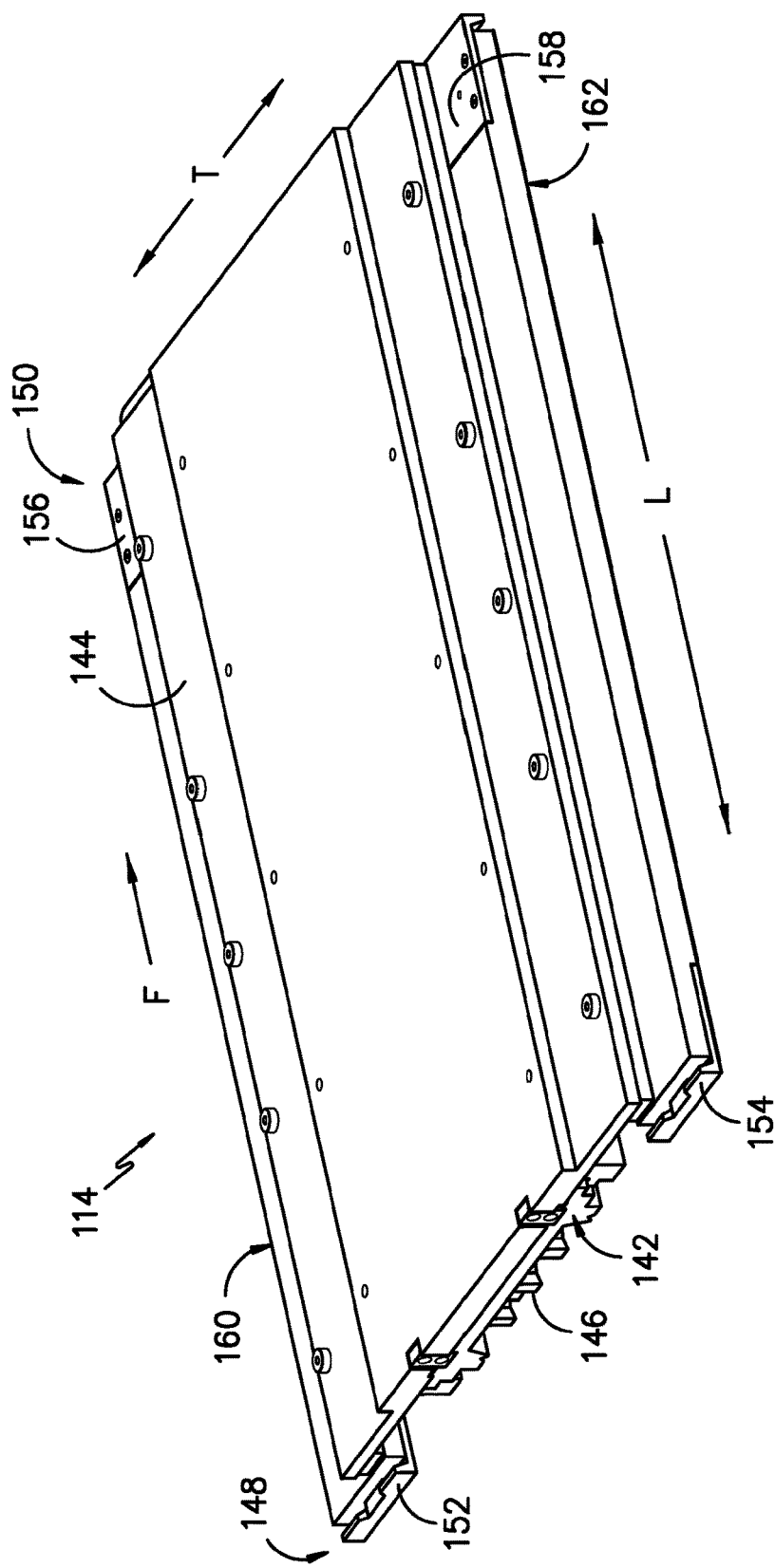

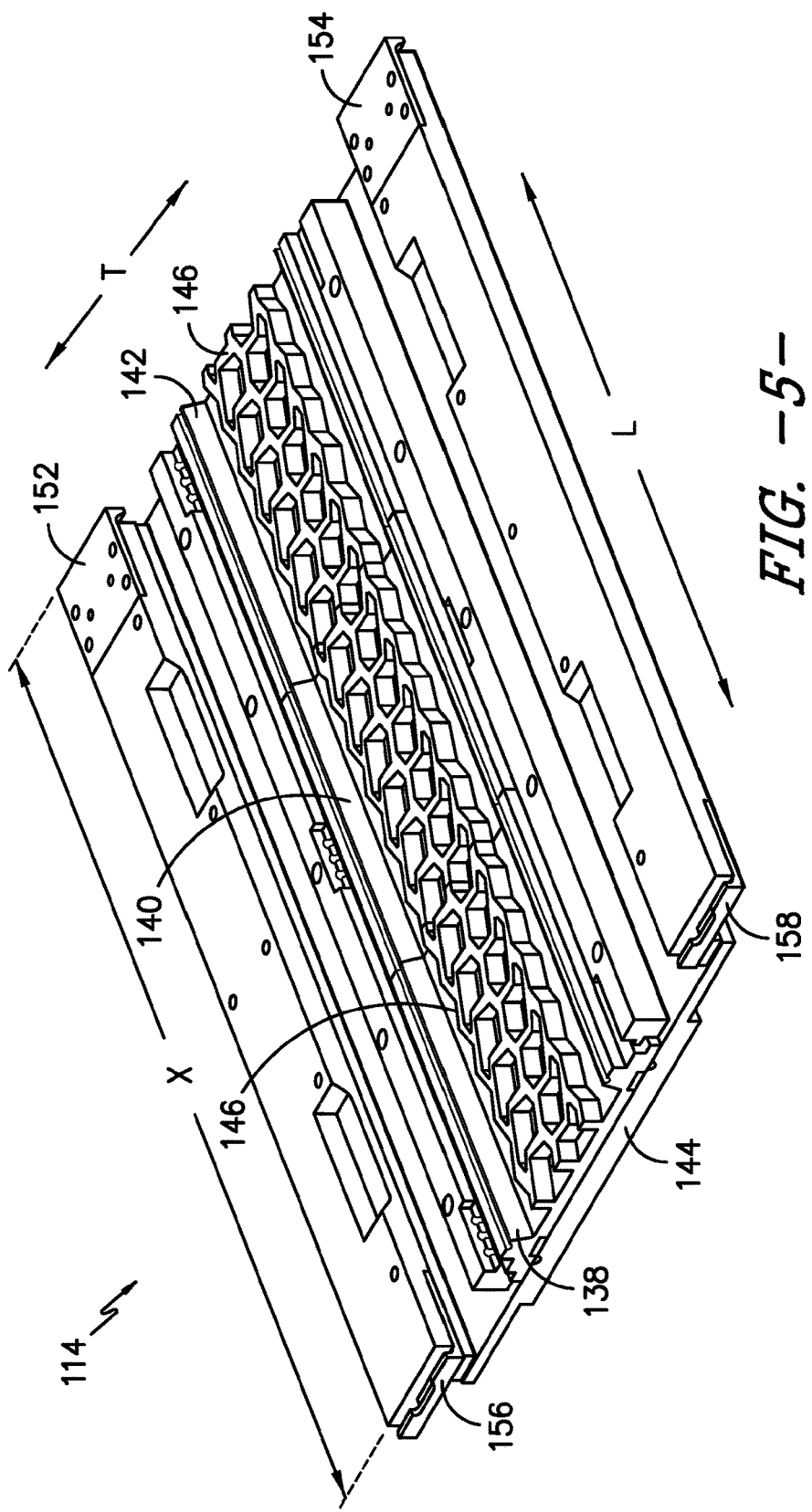
FIG. -5-

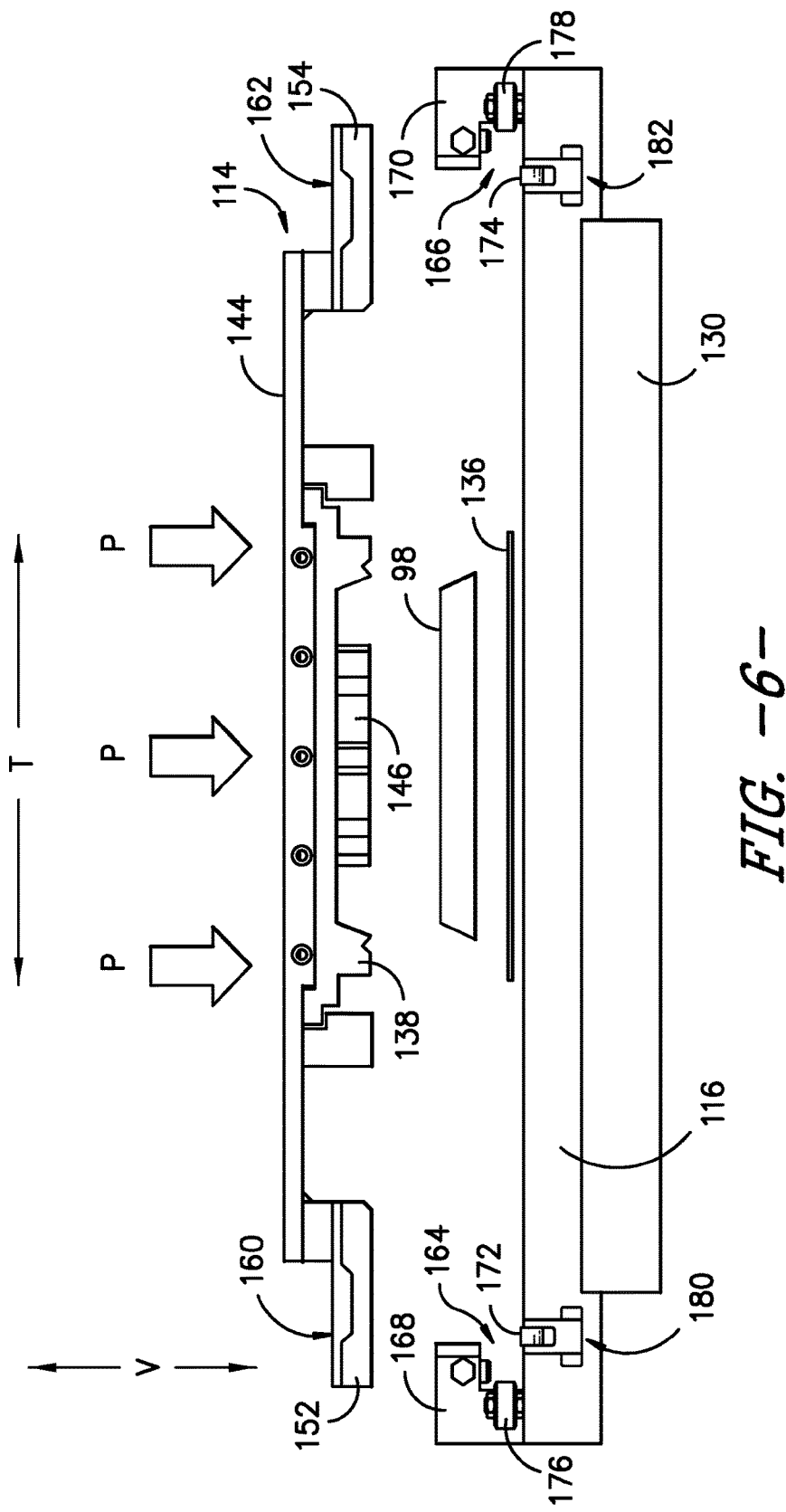
FIG. -6-

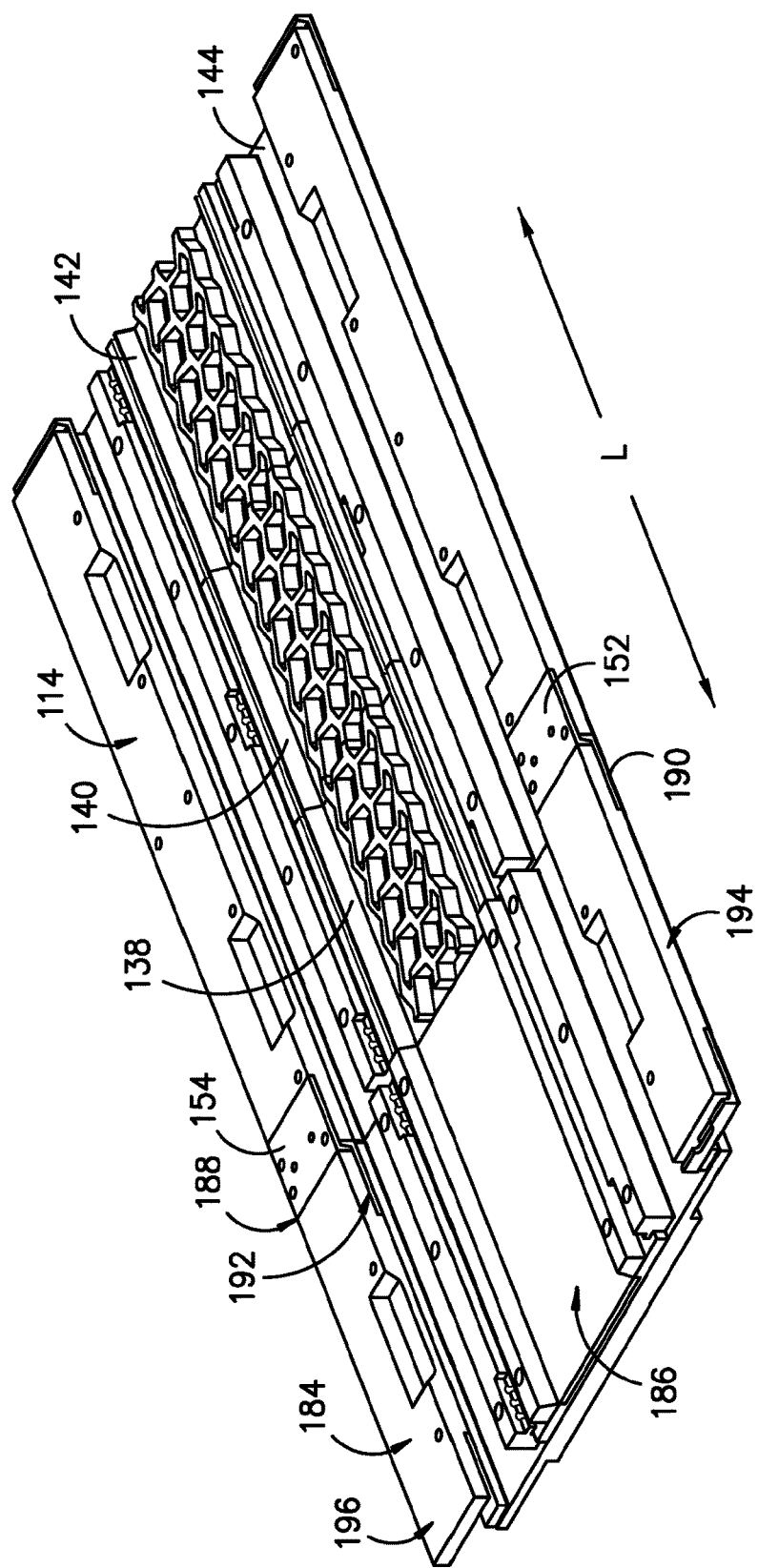

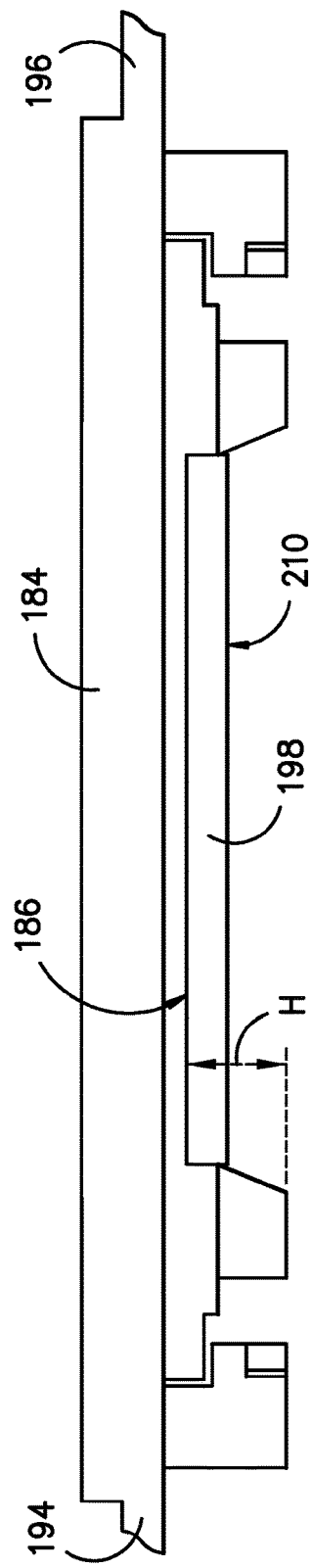
FIG. -8-

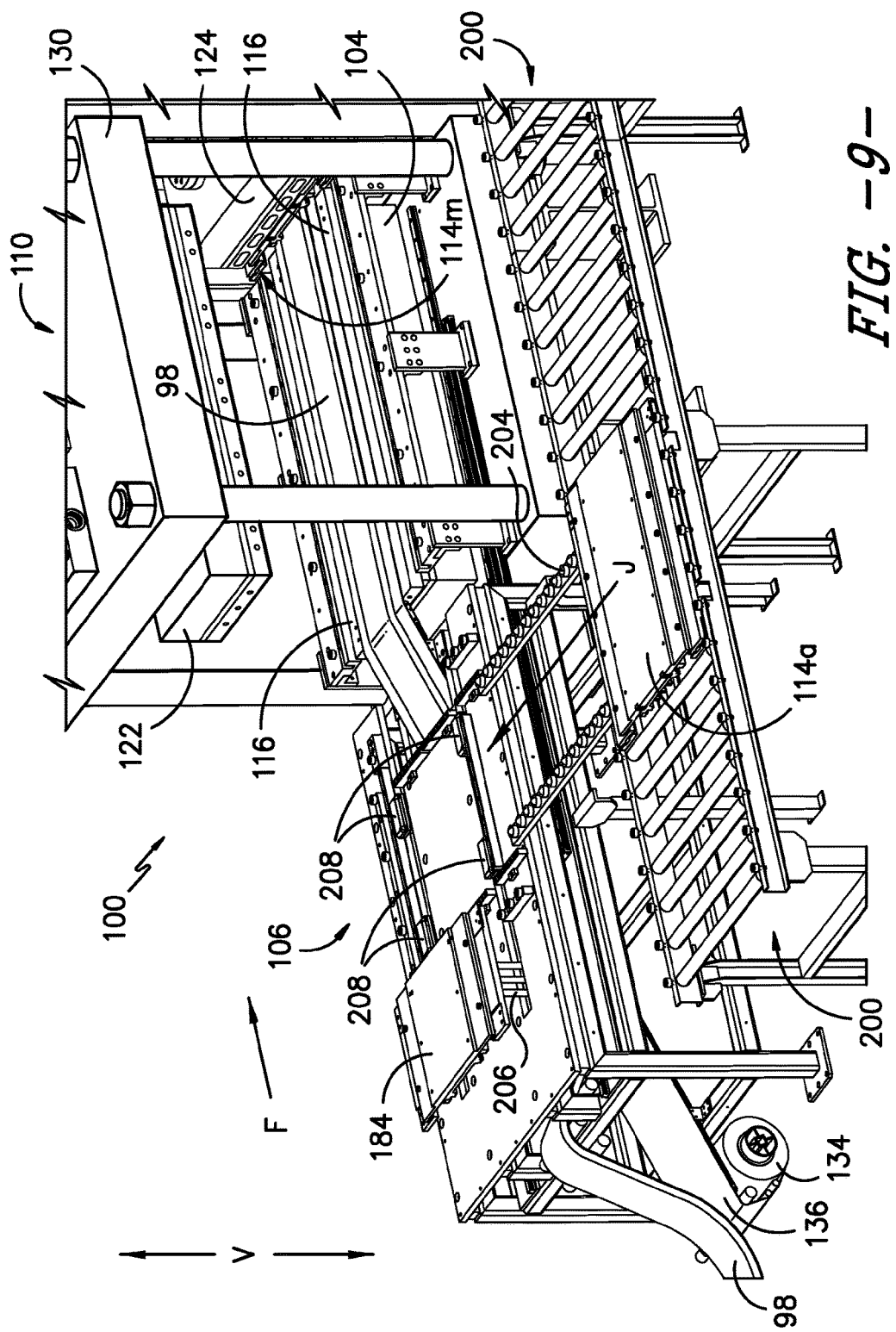
FIG. -9-

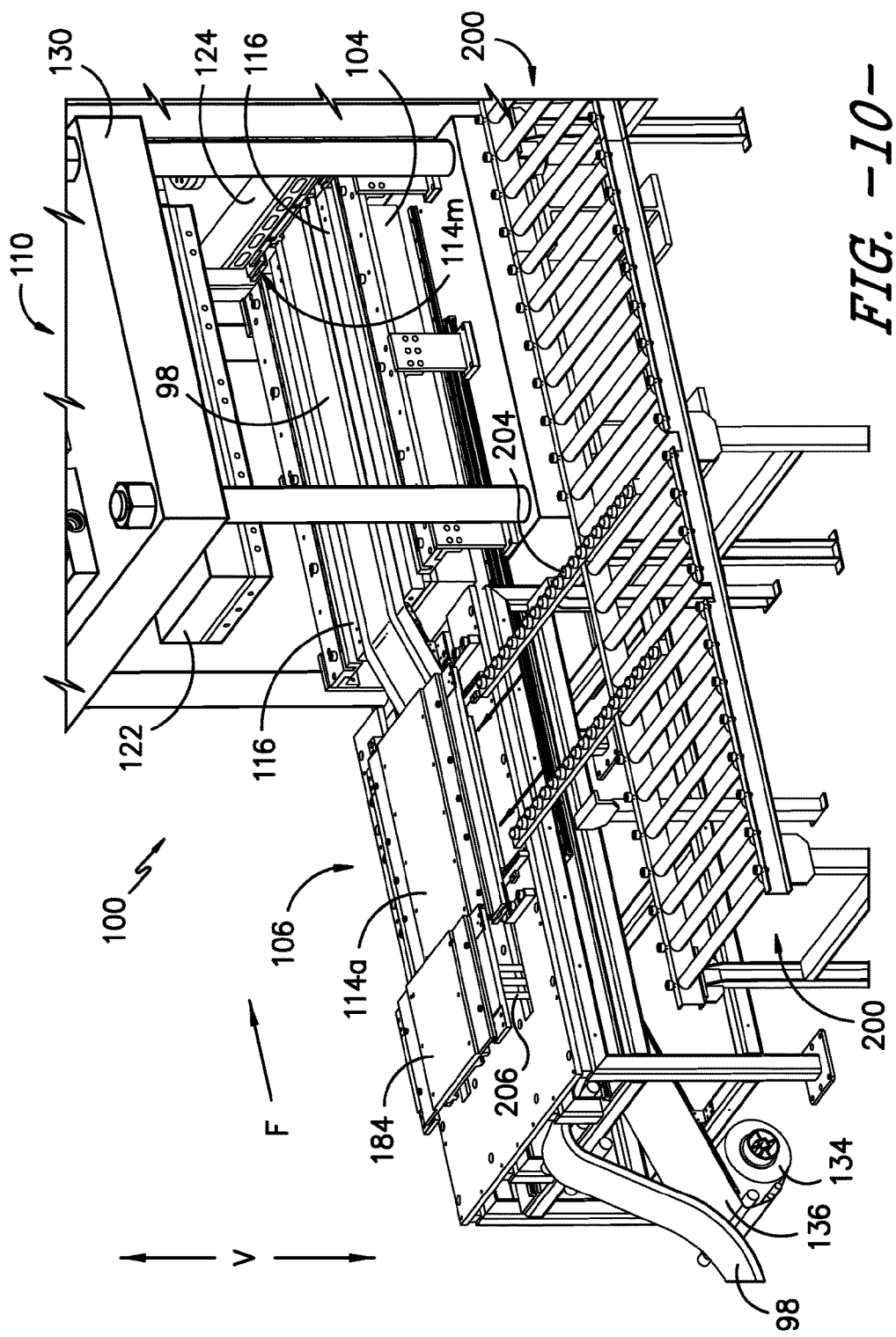
FIG. -10-

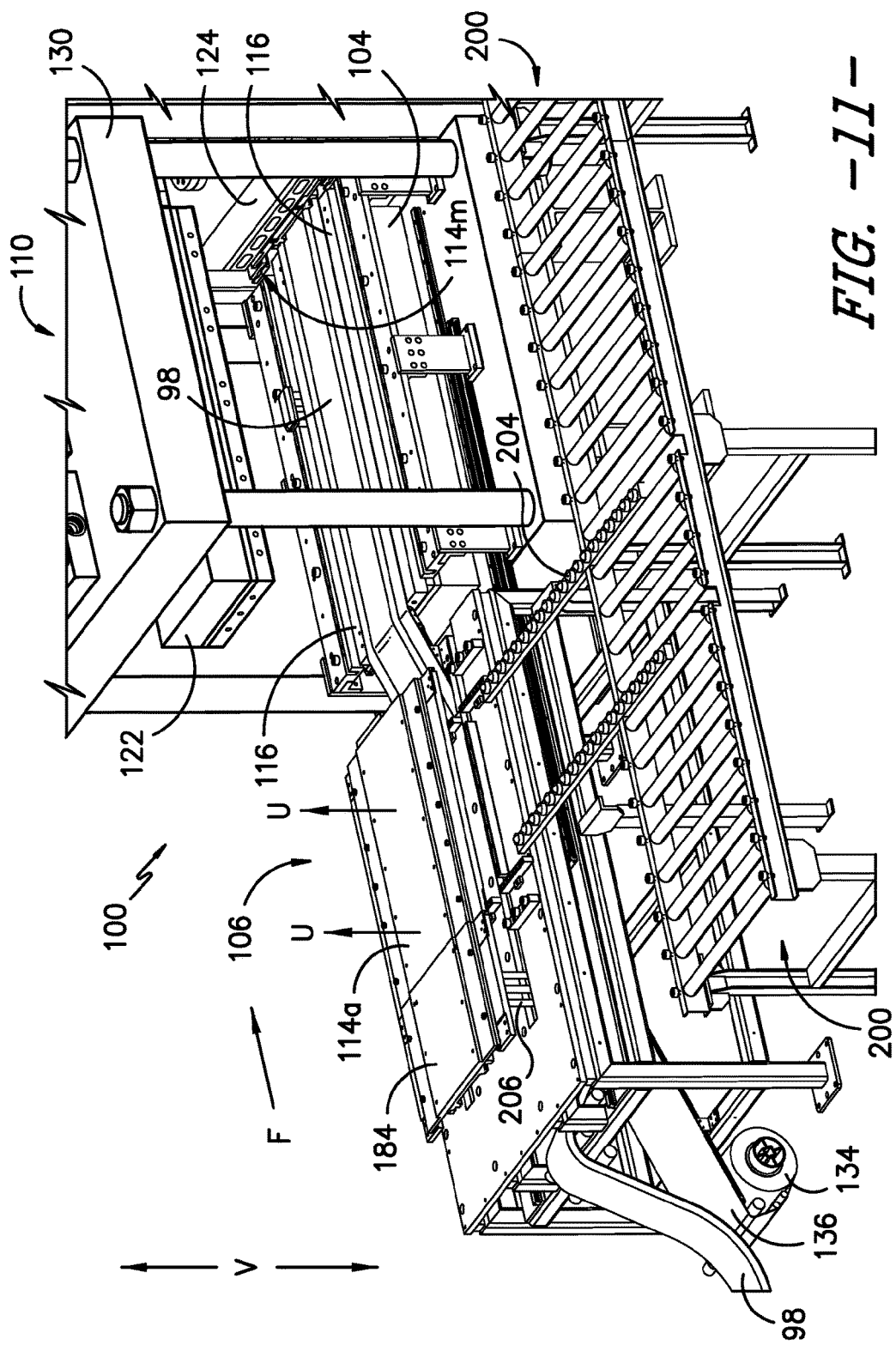
FIG. -11-

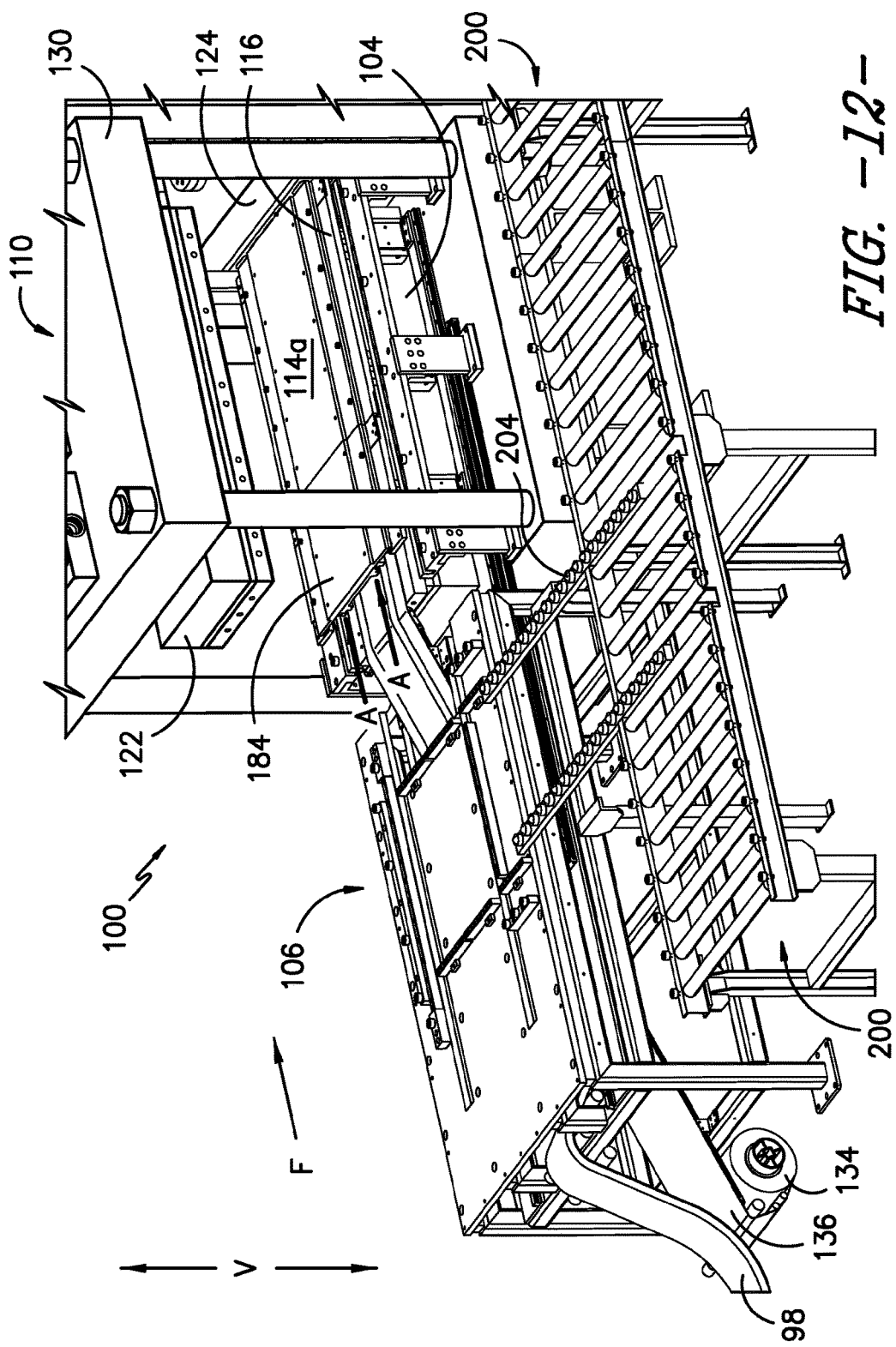
FIG. -12-

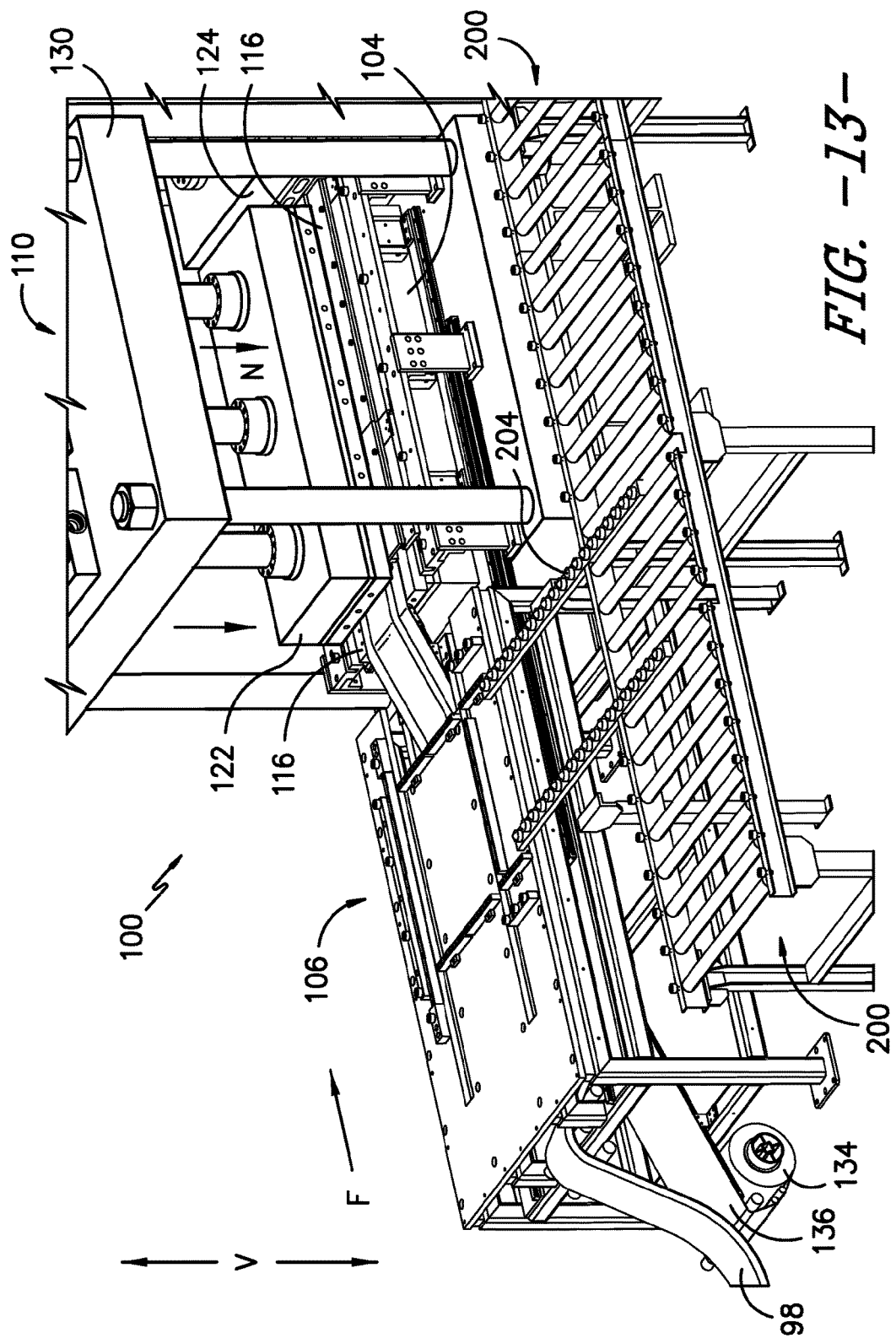
FIG. -13-

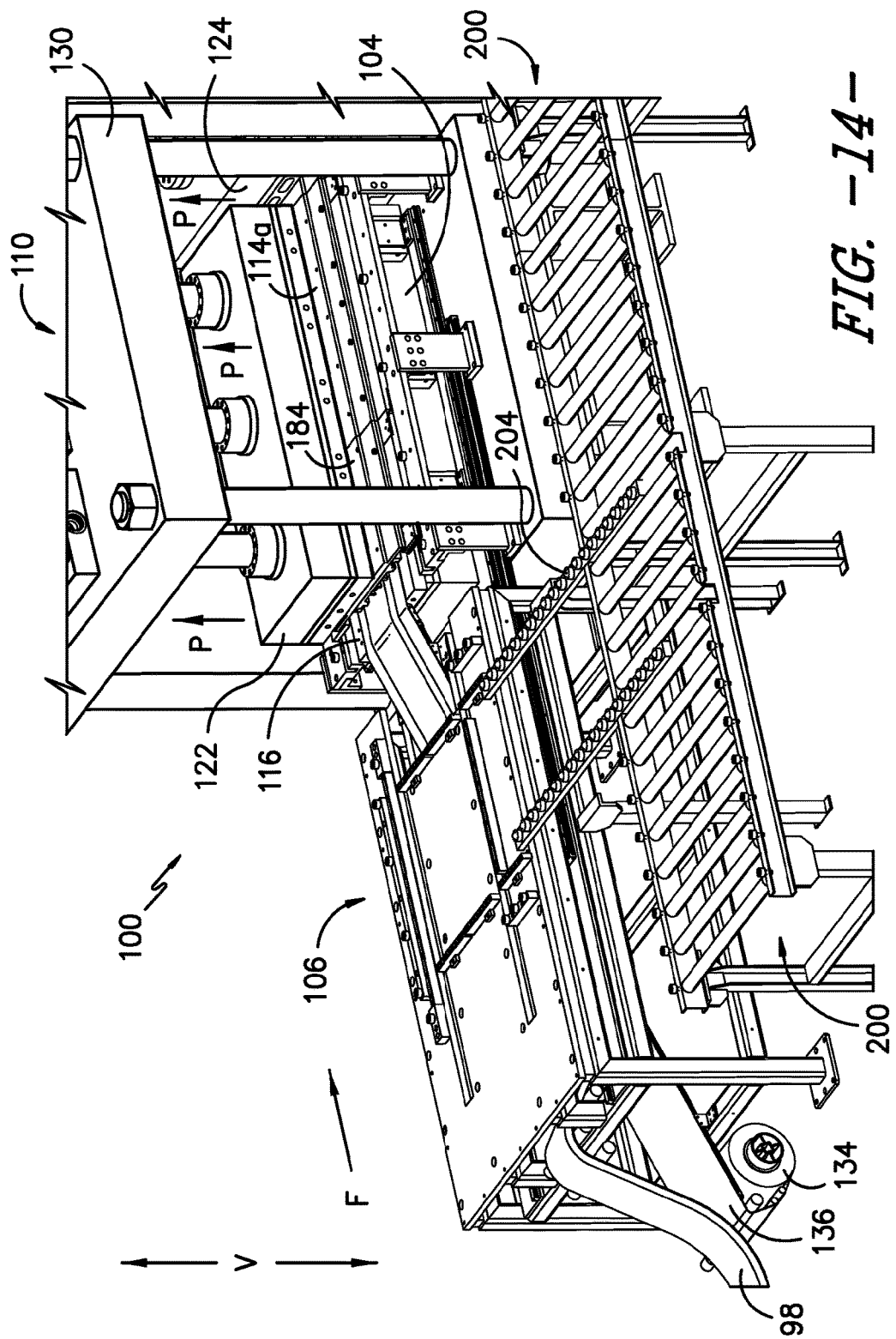
FIG. -14-

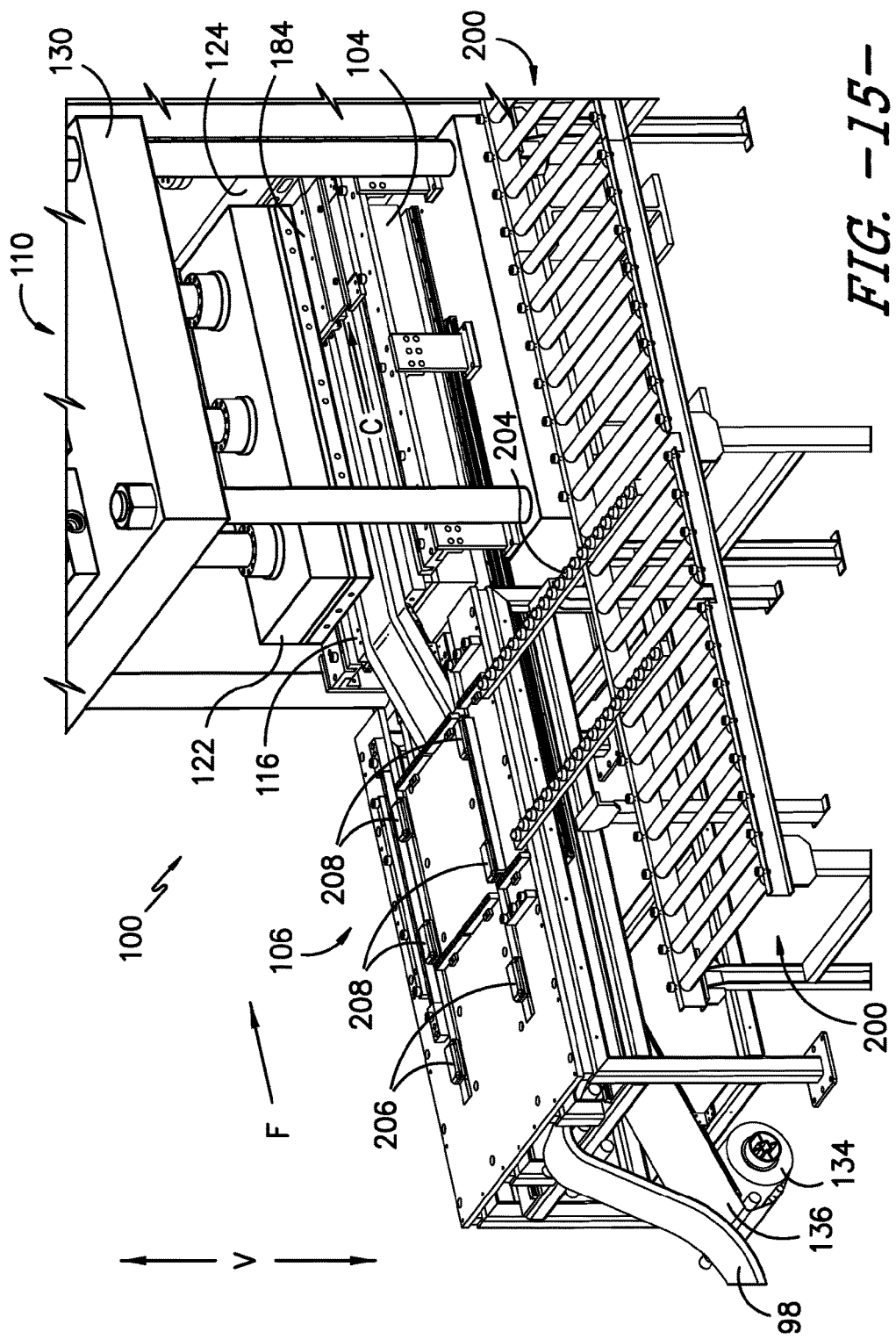
FIG. -15-

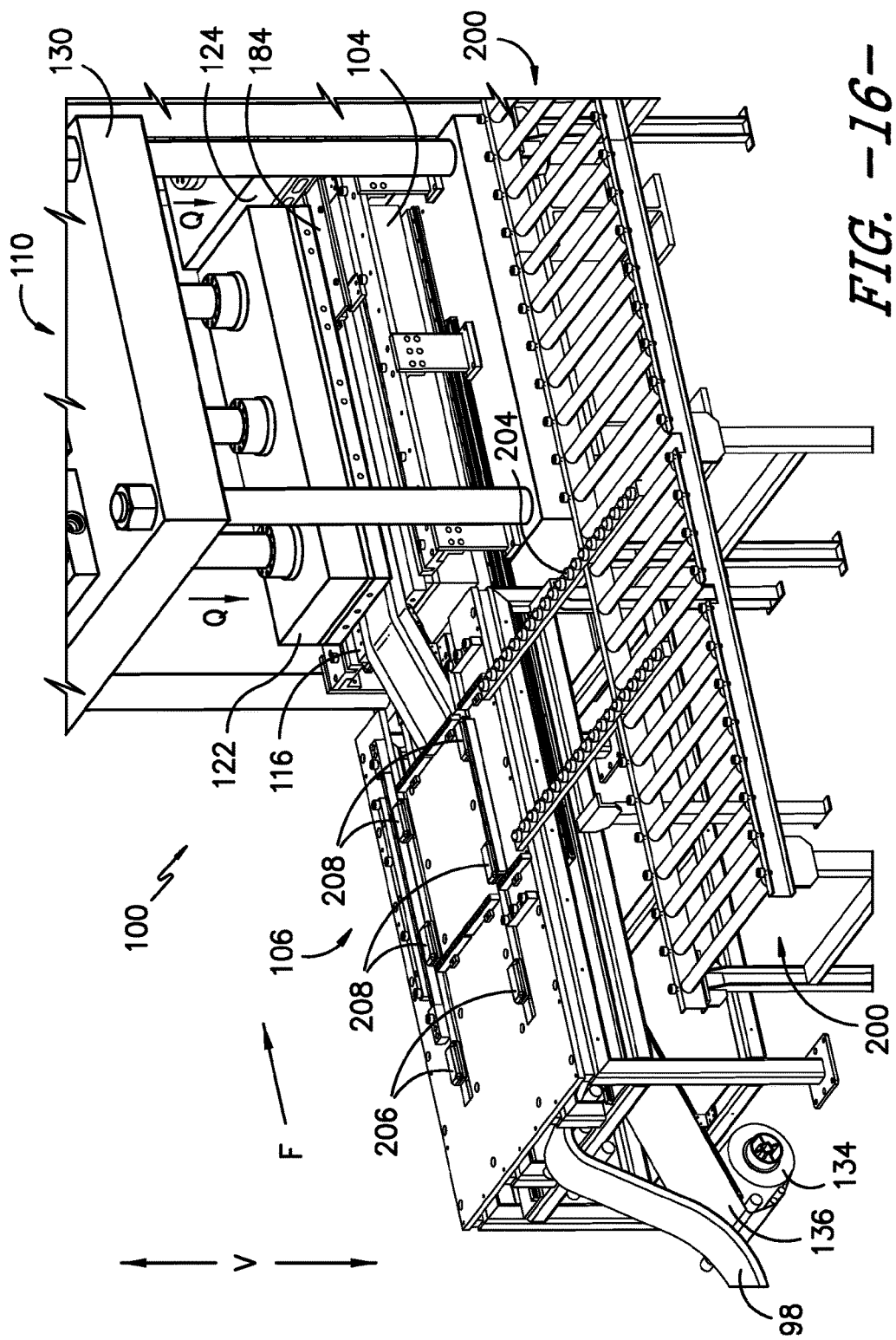
FIG. -16-

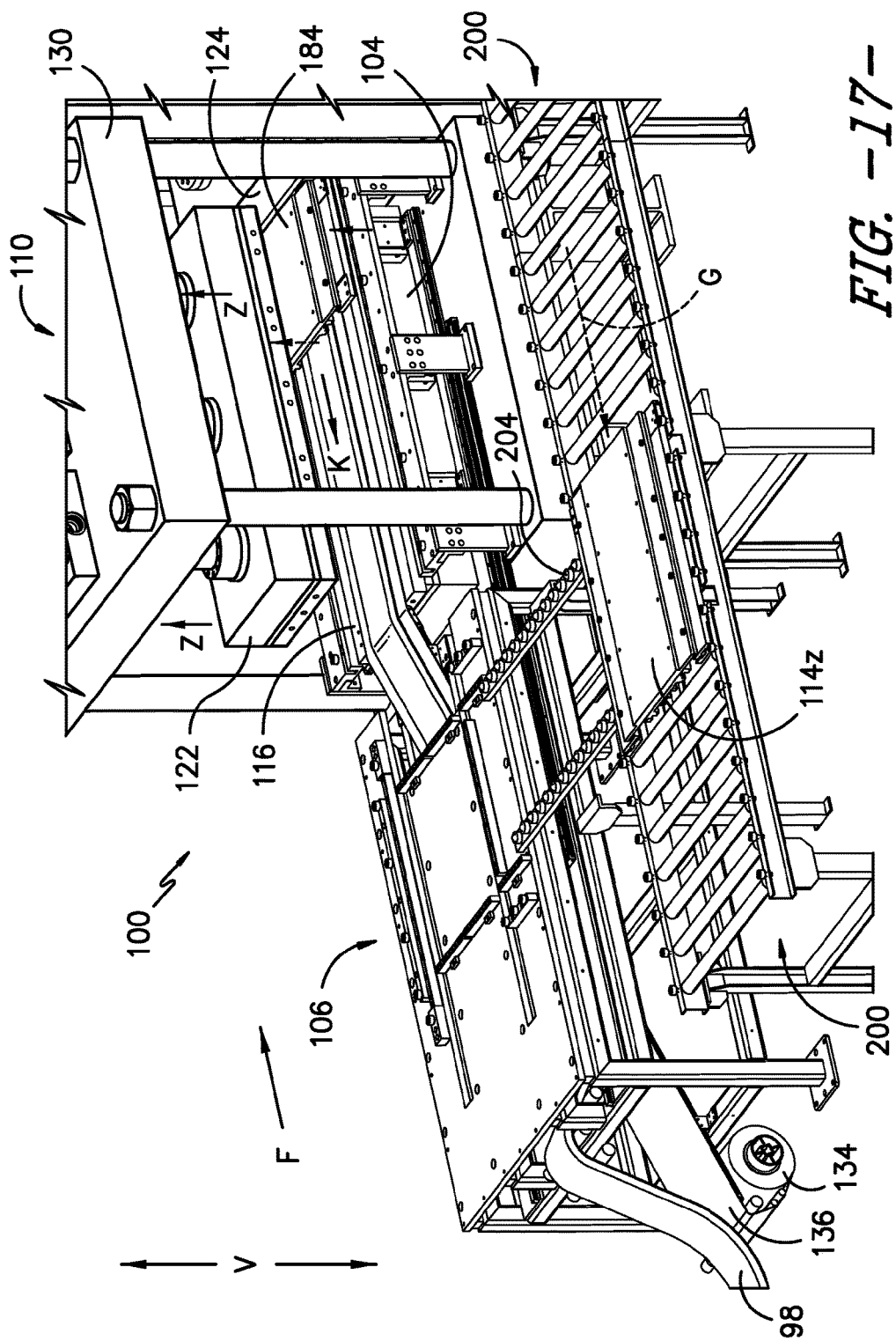
FIG. -17-

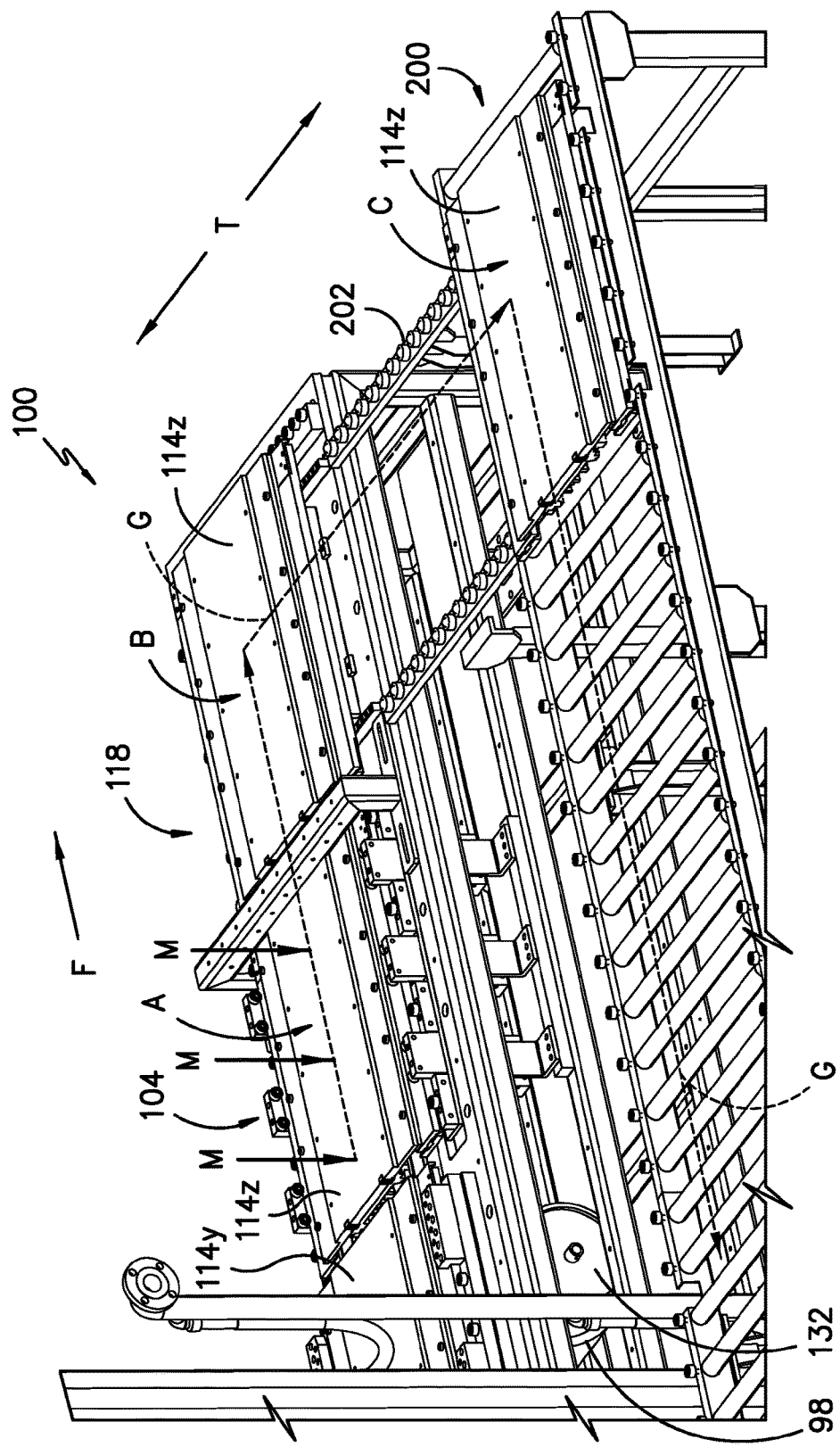
FIG. -18-

SYSTEM WITH PLUG ASSEMBLY FOR CONTINUOUS MOLDING AND CURING OF TIRE TREAD

PRIORITY CLAIM

The present application claims priority to PCT/US15/032918, filed May 28, 2015 in the United States Receiving Office.

FIELD OF THE INVENTION

The subject matter of the present disclosure relates generally to a system for the continuous extrusion, molding, and curing of tread for tires.

BACKGROUND OF THE INVENTION

Conventional methods for the manufacture of tire tread include a multiple step, non-continuous process. Typically, a rubber strip having a desired cross-sectional profile is extruded from a rubber-based formulation that is referred to herein as rubber or a rubber material. The rubber material typically includes a variety of components such as functional elastomers, resins, carbon black fillers, non-carbon black fillers, and/or other substances. As part of the extrusion process, the rubber is heated and fluidized. Pressure from the extruder screw forces the rubber through a die on the extruder outlet that imparts the desired profile to the rubber strip. For example, the strip may be flat, have tapered sides, and include one or more ribs extending along its length. The extruded rubber strip is then wound and stored. Heat energy from extrusion process is usually lost as the rubber cools during the subsequent handling and storage.

In order to apply a tread pattern, the rubber strip is unwound, cut to length, and positioned as separate pieces into a mold. Placement of each strip onto the mold requires carefully positioning each piece into the mold individually. Such placement may be performed in a manually intensive process that requires movement of the relatively heavy rubber strips. As part of the molding process, each rubber strip is reheated in the mold in order to cure the rubber and facilitate the molding of tread features into the rubber strip.

The resulting strips of tread rubber are then removed from the mold. Again, this may be performed manually. Each strip of tread rubber may then be stored again until it is applied to a tire carcass. Joining the tread strip with the tire carcass can require additional heating for completing the curing process and affixing the tire to the carcass.

Such conventional, non-continuous processing for creating the tread is inefficient. The loss of heat energy after extrusion means additional energy expense must be incurred in order to reheat the rubber for subsequent molding and curing. The storage and handling of the rubber in between extrusion and molding adds additional expense in the form of labor and space. Additionally, heating the same rubber strip multiple times requires careful temperature control over specific time periods in order to ensure the proper overall amount of curing is achieved.

Accordingly, a system for the extrusion, molding, and curing of rubber to manufacture tread for tires would be useful. A system that can reduce or eliminate storage and reheating of the rubber between extrusion and molding would be beneficial. Such a system that can perform these operations continuously would be particularly useful.

SUMMARY OF THE INVENTION

The present invention provides a system for the continuous extrusion, molding, and curing of tread for tires. An elongated strip of rubber material is molded and cured shortly after extrusion such that the material retains much of the heat energy of extrusion and does not have to be stored between extrusion and molding. The system uses a plurality of discrete mold assemblies that are conveyed adjacent to each other. As the mold assemblies are advanced sequentially, the uncured and unmolded strip of rubber material is extruded and positioned onto the mold assemblies. While the rubber strip advances, individual portions are sequentially molded and cured by passing through a mold press and then a curing press. A plug assembly is used to prevent the backflow of rubber material during the molding and curing. Additional objects and advantages of the invention will be set forth in part in the following description, or may be apparent from the description, or may be learned through practice of the invention.

In one exemplary aspect, the present invention provides a method for continuous molding and curing of tire tread using a plurality of movable mold assemblies arranged adjacent to each other along a conveying direction. The method includes feeding an elongated strip of rubber material over a lower platen assembly; positioning the mold assemblies and a plug assembly over the lower platen assembly with the elongated strip of rubber material therebetween and the plug positioned upstream of, and adjacent to, the mold assemblies; pressing the mold assemblies and the plug assembly against the elongated strip of rubber material and the lower platen assembly; advancing the mold assemblies, the plug assembly, and the elongated strip of rubber material along the conveying direction; forcing the mold assemblies and the plug assembly against the elongated strip of rubber material and the lower platen assembly; heating at least portions of the elongated strip of rubber material during the forcing; and retracting the plug assembly away from the mold assemblies.

In another exemplary aspect, the present invention provides an apparatus for the continuous molding and curing of tire tread. The apparatus defines a longitudinal axis parallel to an overall conveying direction of rubber material used to form the tire tread. The apparatus includes a plurality of movable mold assemblies. A mold assembly transport mechanism is arranged along the longitudinal axis and is configured for moving mold assemblies along the conveying direction. The mold assembly transport mechanism can also be used to constrain the mold assemblies as the rubber is molded and cured in the apparatus. The mold assembly transport mechanism has an in-feed end and an out-feed end. A lower platen assembly extends along the mold assembly transport mechanism.

A first upper platen assembly is positioned near the in-feed end of the mold assembly transport mechanism and over the lower platen assembly. The first upper platen assembly is electively movable along a vertical direction relative to the lower platen assembly. A second upper platen assembly is positioned adjacent and downstream of the first upper platen assembly and over the lower platen assembly. The second upper platen assembly is selectively movable along the vertical direction relative to the lower platen assembly.

A plug assembly is movable between i) a first position that is not under the first upper platen assembly or the second upper platen assembly and ii) a second position wherein the plug assembly is located between the first upper platen assembly and the lower platen assembly. The plug assembly is configured for selective placement against one of the movable mold assemblies so as to block a backflow of rubber material therefrom.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of an exemplary apparatus of the present invention.

FIG. 2 illustrates a side or elevation view of the exemplary apparatus of FIG. 1.

FIG. 3 provides a top view of the exemplary apparatus of FIG. 1.

FIG. 4 provides a perspective top view of an exemplary mold assembly of the present invention.

FIG. 5 provides a perspective bottom view (i.e. rubber contact side) of the exemplary mold assembly of FIG. 4.

FIG. 6 is an exploded end view of the exemplary mold assembly of FIG. 4 relative to an exemplary mold assembly transport mechanism.

FIG. 7 is a bottom view (i.e. rubber contact side) of an exemplary mold assembly and exemplary plug assembly of the present invention.

FIG. 8 is an end view of the exemplary plug assembly of FIG. 7.

FIGS. 9 through 17 are perspective views near the infeed end of the exemplary apparatus of FIGS. 1-3 and illustrate various steps of an exemplary method of the present invention.

FIG. 18 is a perspective near the outfeed end of the exemplary apparatus of FIGS. 1-3 and illustrates various steps of an exemplary method of the present invention.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

An exemplary apparatus 100 for the continuous extrusion, molding, and curing of tread rubber for tires is illustrated in perspective, side, and top views of FIGS. 1, 2, and 3, respectively. Apparatus 100 includes several mechanisms, the features and operation of which will be further described herein with reference to exemplary embodiments and methods of operation. Along its length, apparatus 100 defines a longitudinal axis L. Arrow F represents a conveying direction or the overall direction of flow of rubber material forming the tread. As will be described, an elongated strip of rubber material 98 enters an infeed end 106 of apparatus 100 as uncured or green material that has not been molded with tread features. After passing through apparatus 100, rubber strip 98 exits outfeed end 118 in a cured state and with tread features molded therein. Portions of rubber strip 98 are molded and cured as it is moved along the conveying direction. Apparatus 100 can be operated without requiring strip 98 to be stored in e.g., rolls and/or experience the concomitant heat loss of such storage.

For this exemplary embodiment, apparatus 100 includes an extruder or extrusion machine 102 positioned near an in-feed end 106 of a mold assembly transport mechanism 104, which extends between ends 106 and 118. Extruder 102 receives rubber material and uses a rotating screw to mix and masticate the materials under elevated pressures and temperatures to create strip 98. One advantage of the present invention is that a variety of different rubber materials may be extruded and molded using the same apparatus 100 to provide a variety of treads requiring e.g., different processing conditions and/or dimensions. The processed rubber material exits extruder 102 as a continuous, elongated strip of rubber material 98 through extruder outlet 108. A die may be included with extruder outlet 108 to impart an overall shape or profile to the extruded rubber strip 98. Rollers 120 allow for compensation loops 96 in rubber strip 98, which can be used to ensure that a sufficient supply of rubber strip 98 is constantly available to apparatus 100 irrespective of the rate of output from extruder 102.

Fed into infeed end 106, rubber material (or rubber strip) 98 extends continuously along the longitudinal axis L of apparatus 100 through a molding press 110 and a curing press 112. Molding press 110 imparts tread features into portions of rubber strip 98 sequentially as it passes therethrough. Different molds may be used to create different tread features as needed for different tires sizes and types.

In one exemplary embodiment, the temperature of rubber strip 98 while in molding press 110 is within 5 degrees Celsius or less of the temperature of rubber strip 98 when it exits extruder 102. For example, rubber strip 98 may be within a temperature range of 90 degrees Celsius to about 100 degrees Celsius as it exits extruder 102 and while in molding press 110. Other temperatures may be used as well. In one exemplary aspect, the present invention can advantageously avoid reheating rubber strip 98 after extrusion because strip 98 is molded shortly after its extrusion in order to minimize heat loss.

Curing press 112 provides additional heat and pressure to partially or fully cure rubber strip 98 as it passes therethrough. In one exemplary embodiment, the temperature of rubber strip 98 is heated to a temperature in the range of about 150 degrees Celsius to about 160 degrees Celsius to help cure rubber strip 98. Other temperatures may be used as well.

In molding press 110 and curing press 112, rubber strip 98 is positioned under a plurality of mold assemblies 114 and over a lower platen assembly 116. Lower platen assembly 116 may include one or more platens extending through mold press 110 and curing press 112. Lower platen assembly 116 provides one or more surfaces against which elongated rubber strip 98 is pressed as part of molding and curing with apparatus 100. For this exemplary embodiment, the vertical position (vertical direction V is denoted in FIGS. 1 and 2) of lower platen assembly 116 is fixed. Other configurations may be used as well. All or portions of lower platen assembly 116 can be equipped with features for heating rubber strip 98. For example, lower platen assembly 116 may be provided with internal passages for the flow of a heat transfer fluid pumped therethrough.

Rubber strip 98 may be tacky after it exits extruder 102. A roll 134 (FIGS. 1 and 2) of anti-stick fabric 136 may be placed between rubber strip 98 and lower platen assembly 116 along apparatus 100. Fabric 136 moves with rubber strip 98 as it passed through apparatus 100 along conveying direction F and can facilitate such movement by reducing friction. For some rubber formulations, lower platen assembly 116 may need to be cleaned even with use of the anti-stick fabric after a certain amount rubber material passes through. Other methods of preventing rubber strip 98 from sticking to lower platen assembly 116 may be used as well.

A first upper platen assembly 122 in molding press 110 and a second upper platen assembly 124 in curing press 112 are each independently movable along vertical direction V relative to lower platen assembly 116. First upper platen assembly 122 can be lowered against mold assemblies 114 in molding press 110 to apply pressure and heat to mold tread features into rubber strip 98. As the mold assemblies 114 are advanced along conveying direction F, second upper platen assembly 124 can be lowered against mold assemblies 114 in curing press 112 to apply pressure and heat to continue curing rubber strip 98. Both platen assemblies 122 and 124 can be raised to allow rubber strip 98 to be advanced along flow direction F and to allow for release of trapped gases in the rubber material.

Each platen assembly 122 and 124 may be constructed from one or more individual platens. A plurality of motors 126 and 128 can be used to raise and lower platen assemblies 122 and 124, respectively. Motors 126 and 128 can be constructed as e.g., individually controlled hydraulic cylinders. As will be further described, the operation of motors 126 and 128 are synchronized with each other and the movement of rubber strip 98 through mold press 110 and curing press 112. As with lower platen assembly 116, each of the upper platen assemblies 122 and 124 can be equipped to apply heat to rubber strip 98 as it moves through apparatus 100. A frame 130 supports the platen assemblies and motors.

For this exemplary embodiment of apparatus 100, the length along longitudinal direction L of curing press 112 is significantly longer than the length of molding press 110. For example, curing press 112 could have a length along longitudinal direction L of about 5 meters while mold press 110 has a length along longitudinal direction L of about 1.5 meters. Other lengths and relative sizes may also be used.

During operation of apparatus 100, rubber strip 98 is translated along conveying direction F, which is parallel to longitudinal axis L. This is accomplished as mold assembly and transport mechanism 104 advances mold assemblies 114 along conveying direction F between infeed end 106 and outfeed end 118. Such movement of mold assembles 114, which are releasably connected with strip 98 as part of its molding and curing, causes rubber strip 98 to move simultaneously so as to translate rubber strip 98 through apparatus 100. Notably, rubber strip 98 passes from infeed end 106 to outfeed end 118 as a continuous strip of rubber material—advancing one mold assembly 114 at a time as such are added at infeed end 106 of mold assembly transport mechanism 104.

A variety of different mechanisms may be used to move mold assemblies 114 along conveying direction F by transport mechanism 104. For example, transport mechanism 104 can include motorized rails, conveying chains, and/or other mechanisms to push, pull, or otherwise convey mold assemblies 114 along lower platen assembly 116.

After mold assemblies 114 are moved through molding press 110 and curing press 112, cured rubber strip 98 with now molded tread features must be demolded from mold assemblies 114 as such are advanced along conveying direction F. As set seen in FIG. 2, near outfeed end 118, rubber strip 98 is pulled away from mold assembly 114z, passes around roller 132, and exits apparatus 100. Anti-stick fabric 136 may remain attached to rubber strip 98 or may be removed therefrom. After exiting outfeed end 118, rubber strip 98 can now be cut into tread sections of the desired size for storage and/or placement onto a tire carcass.

Apparatus 100 includes a mold assembly return mechanism 200 for returning mold assemblies 114 from outfeed end 118 of apparatus 100 to infeed end 106 of apparatus 100. After demolding from rubber strip 98, mold assemblies 114 are transferred laterally along transverse direction T from mold assembly transport mechanism 104 to mold assembly return mechanism 200. A pair of rails 202 can be used to support a mold assembly 114 during such lateral transfer. Mold assembly 114 is then moved, as indicated by arrow R, in a direction opposite to conveying direction F. Near infeed end 106 another pair of rails 204 allow mold assembly 114 to be transferred along transverse direction T from mold assembly return mechanism 200 back to mold assembly transport mechanism 104. As such, mold assemblies 114 are circulated along a loop to provide a continuous supply for molding and translating rubber strip 98 along conveying direction F.

As will be understood using the teachings disclosed herein, a variety of mechanisms can be used to move mold assemblies 114 along return mechanism 200 and rails 202 and 204. By way of example, rails 202, 204 and/or mold assembly return mechanism 200 may have a construction similar to mechanism 104 such as e.g., a motorized conveyor system, rails, and/or a plurality of rollers with one or more devices for transporting mold assemblies 114 along mechanism 200 in the direction of arrow R. Other constructions may be used as well. Additionally, return mechanism 200 may include one or more heating devices for heating mold units 114 as such travel back to infeed end 106 on mechanism 200. Mold assembly return mechanism 200 could also be equipped with a mold cleaning device—removing rubber flashing and/or venting from the mold assemblies 114.

Top, bottom, and end views of an exemplary molding assembly 114 are set forth in FIGS. 4, 5, and 6. A plurality of tread sectors 138, 140 and 142 are attached to a mold back 144. While three tread sectors are shown, one or more tread sectors may be attached to each molding assembly 114. Each tread sector 138, 140, and 142 contains mold features 146 for molding tread features into rubber strip 98 so as to create tire tread. One or more molding assemblies 114 may be required to create the entire length of tread needed for a single tire depending upon e.g., the relative lengths of the tire tread and molding assembly 114.

With reference to flow direction F which points from an upstream position to a downstream position, each mold assembly 114 includes an upstream end 148 and a downstream end 150. Mold assemblies 114 are equipped with locking mechanisms at ends 148 and 150 for releasably interlocking or connecting with adjacent mold assemblies 114 while on transport mechanism 104. For this exemplary embodiment, upstream end 148 has a locking mechanism that includes an opposing pair of upwardly directed hooks or latches 152 and 154. Downstream end 150 has a locking mechanism that includes an opposing pair of downwardly directed hooks or latches 156 and 158. For this exemplary embodiment, hooks 156 and 158 maintain alignment between mold assemblies 114 in the transverse and longitudinal directions. Clamps 168, 170 press and maintain alignment along vertical direction V.

Accordingly, when positioned in an adjacent manner on mold assembly transport mechanism 104, latch 152 and 154 of one mold assembly 114 will engage or connect in a complementary manner with latches 156 and 158 of another, upstream mold assembly 114. Such connected will keep each mold assembly 114 in contact with one or two adjacent mold assemblies 114 as such translate through apparatus 100. The latches can be engaged and disengaged by displacing one mold assembly 114 relative to another along vertical direction V. Latches 152, 154, 156, and 158 are provided by way of example only. Other selectively releasable locking mechanisms may be used as well.

FIG. 6 provides an exploded end view of mold assembly 114 positioned above lower platen assembly 116. Arrows P represents the downward force of pressure applied to mold assembly 114 by platen assemblies 122 or 124, which in turn causes mold features 146 to impart tread features into rubber strip 98 and cure the same. Mold assembly 114 includes a pair of opposing lateral edges 160 and 162 that are separated from each other along transverse direction T. During operation of apparatus 100, lateral edge 160 is positioned in a slot 164 formed between guide rail 168 and lower platen assembly 116 while lateral edge 162 is placed in a slot 166 formed between guide rail 170 and lower platen assembly 116. Clamps 168 and 170 include rollers 176 and 178 that facilitate the centering of mold assemblies 114 as such are moved in conveying direction F along the longitudinal axis L or longitudinal direction L of apparatus 100 by transport mechanism 104.

Roller 172 and 174 can be selectively extended and retracted along vertical direction V. As will be further described, during operation of apparatus 100, mold assemblies 114 are advanced in step-like manner along conveying direction F as rubber strip 98 is continuously extruded, molded, and cured. When the mold assemblies 114 are advanced, rollers 172 and 174 are extended upwardly along vertical direction to lift the mold assemblies 114 away from lower platen assembly 116 and thereby facilitate movement along conveying direction F. Once advanced, rollers 172 and 174 retract, which lowers mold assemblies 114 back into contact with lower platen 116.

As will be further described, a plug assembly 184 is used to prevent the backflow of rubber material from mold assemblies 114 when pressure is applied in the molding press or curing press. As shown in FIGS. 7 and 8, for this exemplary embodiment, plug assembly 184 is blank—i.e. it does not include a tread sector and, instead, has a flat surface 186 so as not to impart tread features into rubber strip 98. Similar to mold assemblies 114, plug assembly 184 includes a releasable locking mechanism for selective attachment with a mold assembly 114. Specifically, downstream end 188 includes an opposing pair of downwardly facing latches 190 and 192 for complementary engagement with opposing latches 152 and 154 on the upstream end 148 of a mold assembly 114. By displacing plug assembly 184 relative to mold assembly 114 along vertical direction V, plug assembly 184 can be selectively engaged and disengaged from a mold assembly 114. Similar to mold assemblies 114, plug assembly 184 includes lateral edges 194 and 196 that can be extend into, and retracted out of, slots 164 and 166 during operation of apparatus 100.

Referring to FIG. 8, plug assembly 184 can be equipped with a spacer 198 for purposes of adjustment. Interchangeable spacer 198 can be positioned onto surface 186 of plug assembly 184 and used to selectively adjust the amount of space or height H along vertical direction V between rubber strip 98 and flat surface 210 of spacer 194. In turn, this allows the amount of resistance to the backflow of rubber from an adjacent mold assembly 114 to be adjusted (using spacers 194 of different thicknesses of heights) as part of the setup and operation of apparatus 100.

An exemplary method of the present invention using exemplary apparatus 100 will now be set forth. Using the teachings disclosed herein, one of skill in the art will understand that the exemplary method may be used with other exemplary apparatuses of the invention as well to provide additional exemplary methods. As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

Referring now to FIG. 9, apparatus 100 is shown with mold press 110 in an open position wherein first upper platen assembly 122 has been raised away from lower platen assembly 116. Curing press 112 is depicted in a closed position wherein second upper platen assembly 124 has been lowered onto several mold assemblies include mold assembly 114m and is pressing such mold assemblies against elongated rubber strip 98 and lower platen assembly 116. At the same time, second upper platen assembly 124 is also heating rubber strip 98 to provide for curing.

Continuing with FIG. 9, plug assembly 184 is depicted in a retracted or "first position" where it is not located between first upper platen assembly 122 and lower platen assembly 116. Lift cylinders 206 have also raised plug assembly 184 in preparation for connecting a mold assembly 114 thereto. While plug assembly 184 is in this first position, a first mold assembly 114a is shifted transversely (arrow J) by way of rails 204 from mold assembly return mechanism 200 as shown in FIG. 9 to mold assembly transport mechanism 104 as shown in FIG. 10.

In FIG. 11, a plurality of lift cylinders 208 (FIG. 9) are used to raise (arrows U) mold assembly 114a along vertical direction V. This vertical motion engages latches 152 and 154 along upstream end 148 of mold assembly 114a with latches 190 and 192 on a downstream end 188 of plug 184 (FIG. 7)—thereby releasably connecting or linking plug 184 and mold assembly 114a. Notably, in FIG. 11, mold assembly 114a is not yet located between first upper platen assembly 122 and lower platen assembly 116.

As depicted in FIG. 12, mold assembly 114a is advanced (arrows A) along conveying direction F to a position between first upper platen assembly 122 and lower platen assembly 116. Similarly, plug assembly 184 has also been advanced (arrows A) from the first position shown in FIGS. 9, 10 and 11, to a second position where plug assembly 184 is upstream of, and adjacent to, a plurality mold assemblies 114 (including mold assembly 114a). In this section position, plug assembly 184 is also between first upper platen assembly 122 and lower platen assembly 116—but is not adjacent to second upper platen assembly 124. In FIG. 12, mold assembly 114a and plug assembly 184 are positioned over elongated rubber strip 98, which has been fed over lower platen assembly 116 from extruder 102.

In FIG. 13, first upper platen assembly 122 is lowered (arrows N) to press plug assembly 184 and mold assembly 114a against lower platen assembly 116. Such pressing molds tread features into that portion of rubber strip 98 that is located between mold assembly 114a and lower platen assembly 116. Heat may also be transferred to rubber strip 98 from first upper platen assembly 122. At the same time the pressure applied to plug assembly 184 blocks or prevents the uncured rubber material of such portion of strip 98 from flowing away from mold assembly 114a and counter to flow direction F. As this mold assembly 114a is being pressed to mold a portion of rubber strip 98, second upper platen assembly 124 continues to press a plurality of downstream mold assemblies 114 against downstream portions of rubber strip 98 to continue the curing process. Thus, in FIG. 13, both molding press 110 and curing press 112 are in a closed position.

Next, as depicted by arrows P in FIG. 14, first upper platen assembly 122 and second upper platen assembly 124 are each raised a short distance along vertical direction V so that mold press 110 and curing press 112 are both open. Rollers 172 and 174 (FIG. 6) are raised along vertical direction V (e.g., 1-2 mm) to thereby raise the plurality of mold assemblies 114 on transport mechanism 104 (including mold assembly 114a and mold assembly 114m) positioned below first and second upper platen assemblies 122 and 124.

As depicted by arrow C in FIG. 15, mold assembly transport mechanism 104 advances mold assemblies 114 (including mold assemblies 114a and 114m) along the conveying direction F. Plug assembly 184, rubber strip 98, and fabric 136 also advance simultaneously with the movement of mold assemblies 114. Thus, in FIG. 15, plug assembly 184 now occupies a third position along longitudinal direction L where it is below the first upper platen assembly 122 and will be adjacent to the second upper platen assembly 124 when press 112 is closed. By way of example, the amount of movement along conveying direction F is equal to the length along longitudinal direction L of a mold assembly 114.

After such advancement, first upper platen assembly 122 and second upper platen assembly 124 are again lowered (arrows Q) to force plug assembly 184 and molding assemblies 114 (including mold assembly 114a and 114m) against rubber strip 98 and lower platen assembly 116. Rollers 172 and 174 are simultaneously retracted during such lowering to help balance assembles 114. Heat can also be applied to second upper platen assembly 124 to help cure rubber strip 98. At the same time, plug assembly 184 prevents the backflow of rubber material from beneath second upper platen assembly 124. As previously indicated, the thickness of spacer 194 (FIG. 8) is selected so as to prevent such backflow.

Referring to FIG. 17, after a sufficient time has elapsed for curing of rubber strip 98, first upper platen assembly 122 is raised (arrows Z) along vertical direction V to release plug assembly 184. Now, plug assembly 184 is retracted back (arrow K) back to its first position (depicted in FIG. 9). A second mold assembly 114z is now ready to be transferred along transverse direction T from mold assembly return mechanism 200 to repeat the process just described beginning with FIG. 9.

As rubber strip 98 and mold assemblies 114 are advanced along conveying direction F (discussed in connection with FIG. 15), portions of rubber strip 98 eventually arrive at outfeed end 118 as cured and molded tread material. FIG. 19 illustrates tread 98 being demolded from mold assembly 114y. For second molding assembly 114z, broken arrows G denote the movement of molding assembly 114z through positions A, B, and C.

More specifically, in position A, mold assembly 114z is lowered (arrows M) along vertical direction V so as to disconnect it from mold assembly 114y. Such lowering allows latches 152 and 154 on the upstream end 148 of mold assembly 114z to be released from latches 156 and 158 on the downstream end 150 of mold assembly 114y (see FIGS. 4 and 5).

Mold assembly 114z is then advanced along flow direction F to position B. From position B on mold assembly transport mechanism 104, mold assembly 114z can be moved along transverse direction T over rails 202 to mold assembly return mechanism 200 at position C. As previously described, mold assembly return mechanism moves mold assembly 114z from outfeed end 118 to infeed end 106 at the position shown in FIG. 17. From this location, mold assembly 114z can be transferred onto mold assembly transport mechanism 104 as described with respect to mold assembly 114a in FIG. 9.

As described above, after extrusion, rubber strip 98 is molded and cured in portions equal to the length X—along longitudinal direction L—of an individual mold assembly 114. Specifically, as a portion of strip 98 reaches a position under first upper platen assembly 122, it is molded by an individual mold assembly 114. As this same portion advances with this same mold assembly 114, such portion of strip 98 is sequentially cured as it advances step-wise and by length X under the second upper platen assembly 124. As will be understood by one of skill in the art using the teachings disclosed herein, in other embodiment of the invention more than one mold assembly at a time may be advanced and placed under platen assembly 122 depending upon e.g., the relative sizes of mold assemblies 114 and platens 122 and 124.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. An apparatus for the continuous molding and curing of tire tread, the apparatus defining a longitudinal axis, the apparatus comprising:
   a plurality of movable mold assemblies;
   a mold assembly transport mechanism arranged along the longitudinal axis and configured for moving the mold assemblies along a conveying direction, the mold assembly transport mechanism having an in-feed end and an out-feed end;
   a lower platen assembly extending along the mold assembly transport mechanism;
   a first upper platen assembly positioned adjacent the in-feed end of the mold assembly transport mechanism and over the lower platen assembly, the first upper platen assembly selectively movable along a vertical direction relative to the lower platen assembly;

a second upper platen assembly positioned adjacent and downstream of the first upper platen assembly and over the lower platen assembly, the second upper platen assembly selectively movable along the vertical direction relative to the lower platen assembly; and a plug assembly is movable between i) a first position away that is not under the first upper platen assembly or the second upper platen assembly and ii) a second position wherein the plug assembly is located between the first upper platen assembly and the lower platen assembly, the plug assembly configured for selective placement against one of the movable mold assemblies so as to block a back flow of rubber material therefrom.

2. The apparatus for the continuous molding and curing of tire tread as in claim 1, further comprising one or more motors for moving the first and second upper platen assemblies along the vertical direction.

3. The apparatus for the continuous molding and curing of tire tread as in claim 1, further comprising an extruder positioned upstream from the mold assembly transport mechanism and configured for extruding a strip of rubber material for positioning over the lower platen assembly.

4. The apparatus for the continuous molding and curing of a tire tread as in claim 1, further comprising:

a mold assembly return mechanism extending longitudinally in an adjacent and parallel manner to the mold assembly transport mechanism, the mold assembly return mechanism configured for transporting one or more mold assemblies in a direction opposite to the conveying direction of the mold assembly transport mechanism and back to the in-feed end of the mold assembly transport mechanism.

\* \* \* \* \*